United States Patent [19]

Nagase et al.

[11] Patent Number: 5,398,269
[45] Date of Patent: Mar. 14, 1995

[54] WATER QUALITY CONTROL METHOD AND DEVICE FOR NUCLEAR POWER PLANT, AND NUCLEAR POWER PLANT

[75] Inventors: Makoto Nagase, Hitachi; Yamato Asakura; Naohito Uetake, both of Katsuta; Toshio Sawa; Shunsuke Uchida, both of Hitachi; Renzo Takeda, Kawasaki; Katsumi Ohsumi, Hitachi, all of Japan

[73] Assignee: Hitachi, Ltd., Tokyo, Japan

[21] Appl. No.: 33,548

[22] Filed: Mar. 18, 1993

[30] Foreign Application Priority Data

Mar. 19, 1992 [JP] Japan .................. 4-063147

[51] Int. Cl.$^6$ ............................... G21C 19/307
[52] U.S. Cl. ........................... 376/306; 376/310
[58] Field of Search ............... 376/305, 306, 310, 313

[56] References Cited

U.S. PATENT DOCUMENTS

| | | | |
|---|---|---|---|
| 4,042,455 | 8/1977 | Brown | 376/306 |
| 4,894,202 | 1/1990 | Nagase et al. | 376/306 |
| 5,015,436 | 5/1991 | Nagase et al. | 376/306 |
| 5,245,642 | 9/1993 | Lin | 376/306 |

FOREIGN PATENT DOCUMENTS 61-79194 4/1986 Japan .
1-316692 12/1989 Japan .

OTHER PUBLICATIONS

Journal of Nuclear Science and Technology, 24, pp. 289-296, Apr. 1987.

*Primary Examiner*—Daniel D. Wasil
*Attorney, Agent, or Firm*—Antonelli, Terry, Stout & Kraus

[57] ABSTRACT

A water quality control method for a nuclear power plant comprising the steps of maintaining the iron concentration in the feed water below 0.05 ppb by increasing iron removing rate at a condensed water purifying loop, shifting the pH of the reactor water below a pH of 6.8 determined at a room temperature by injecting carbon dioxide gas in the primary cooling system and further optionally reducing the dissolved oxygen concentration in the reactor water below 20 ppb by injecting hydrogen gas into the primary cooling system, whereby $^{60}Co$ ion concentration in the primary cooling system is maintained low for a long interval.

23 Claims, 4 Drawing Sheets

WATER QUALITY CONTROL METHOD AND DEVICE FOR NUCLEAR POWER PLANT, AND NUCLEAR POWER PLANT

BACKGROUND OF THE INVENTION

1. Field of the Invention

The present invention relates to a water quality control method and device for a nuclear plant, and a nuclear power plant and, in particular, relates to a water quality control method and device for a water cooling direct cycle type nuclear power plant which is suitable for further reducing concentration of radioactive corrosion products in the reactor water, in other words a nuclear power plant including such a nuclear reactor as a boiling water reactor and an advanced converter reactor wherein water is used as a coolant, and further relates to a water cooling direct cycle type nuclear power plant.

2. Description of Related Art

JP-A-61-79194 (1986) discloses a conventional method of controlling concentration of corrosion products in the feed water wherein $^{58}Co$ ion concentration in the reactor water is reduced by adjusting Fe/Ni concentration in the feed water from 2 to 10.

Further, JP-A-1-316692 (1989), which corresponds to U.S. Pat. No. 5,015,436, discloses to reduce $^{60}Co$ ion concentration in the reactor water by controlling iron concentration in the feed water by making use of the iron accumulation rate on fuel rod surfaces as a control index.

The former conventional method only notes the Fe/Ni concentration ratio in the feed water for achieving an optimum control, however even when $^{58}Co$ ion concentration of a low level is achieved while fulfilling a required condition of the Fe/Ni concentration ratio, $^{60}Co$ ion concentration in the reactor water possibly increases beyond an estimated level, therefore the use of the Fe/Ni concentration ratio as a control index leaves a problem.

The latter conventional method which controls the iron concentration by making use of the ion accumulation rate on the fuel rod surfaces as a control index resolves the problem in the former conventional method, however when a hydrogen injecting operation is performed for such as counter-measuring a stress corrosion cracking of reactor structures, the reactor water environment changes into a reducing atmosphere and dissolution of oxides is accelerated, as a result, an eluting speed of $^{60}Co$ ion from oxide layers of Co accumulated on the fuel rod surfaces is increased, therefore $^{60}Co$ ion concentration in the reactor water is presumed to increase again.

Further, in view of an effective use of fuels there is a plan to prolong the life time of fuels, in other words prolonging one operating cycle period, and to increase burn-up of the fuels. The greater output extraction from the fuels according to the plan leads to quickening of radio activation of Co deposited on the fuel rod surfaces and to increasing radio activity ratio. Accordingly, in response thereto an increase of $^{60}Co$ ion concentration in the reactor water is presumed.

However, in conventional nuclear power plant control no sufficient considerations are given for the problems which will be caused in association with changes in operation environment in future such as the hydrogen injecting operation and the increase of burn-up of the fuels.

SUMMARY OF THE INVENTION

An object of the present invention is to provide a water quality control method and device for a nuclear power plant and a nuclear power plant itself which can reduce $^{60}Co$ ion concentration in the reactor water even if the operation environment thereof is changed in future as indicated above.

In a nuclear power plant comprising a nuclear reactor, a turbine, a condenser, a condensed water purifying unit and a feed water heater successively arranged as main constitution, the above object of the present invention is achieved by making use of inventory of Co accumulated on fuel rod cladding tubes in the nuclear reactor as a control index and by controlling water quality of cooling water fed to the nuclear reactor toward a direction where the inventory of the Co decreases. The term "inventory" implies the amount or mass of elements deposited or accumulated on the surfaces of fuel cladding tubes and, in particular, with regard to radioactive nuclides an amount of radioactivity in stead of mass is implied.

Methods of controlling water quality of the cooling water in a direction where the inventory of Co accumulating on the fuel rod cladding tubes include a method of controlling water quality of the cooling water so as to reduce a deposition rate of Co ions in the reactor water onto the fuel rod cladding tubes and a method of controlling water quality of the cooling water so as to increase an eluting speed of Co ions from oxides of Co accumulated on the fuel rod cladding tubes.

The method of controlling water quality of the cooling water by reducing a deposition rate of Co ions in the reactor water on the fuel rod cladding tubes is achieved by controlling an ion concentration in the feed water less than 0.1 ppb, more preferably less than 0.05 ppb.

The method of controlling water quality of the cooling water so as to increase an eluting speed of Co ions from oxides of Co accumulating on the fuel rod cladding tubes is achieved by controlling water quality of the cooling water in such a manner that pH of the reactor water determined at a room temperature is rendered to a weak acidic state, for example, less than 6.8.

The method of controlling pH of the reactor water in a weak acidic state includes a method wherein substances, which produce acidic ions in the reactor water such as nitrogen, dinitrogen monoxide and carbon dioxide, is injected into the cooling water, and a method wherein a negative ion exchange resin for one line of a purifying unit in a reactor water clean-up loop is replaced with a nitric acid type negative ion exchange resin and the reactor water flowrate passing through the purifying unit is controlled to control pH in the reactor water via the flow-out nitric acid ions.

Further, during the pH control it is preferable to sample out the reactor water, to cool the sampled reactor water down to a room temperature, to determine the pH and to control the gas amount to be injected into the cooling water so as to reduced the determined pH below a predetermined value.

Further, it is preferable to combine an operation, wherein a reactor water flow rate passing through the purifying unit in the reactor water clean-up loop is selected more than 2% of the flow rate of the feed water, with the above explained water quality control method for a nuclear power plant.

In the above explained water quality control method for a nuclear power reactor wherein pH in the reactor water is controlled in a weak acidic state, it is further preferable to control the reactor water in a reducing atmosphere by reducing the dissolved oxygen concentration in the reactor water, for example, below 20 ppb through hydrogen injection into the cooling water.

The water quality control device according to the present invention is constituted by means for detecting an iron concentration in the cooling water, means for controlling the operation of the condensed water purifying unit in such a manner that the iron concentration in the feed water shows less than 0.1 ppb based upon the detected value from the detecting means, means for sampling out the reactor water, cooling the sampled reactor water down to a room temperature and determining pH thereof and means for controlling the water quality of the cooling water in such a manner that the pH of the reactor water determined at the room temperature is rendered in a weak acidic state based upon the determined value from the determining means.

The nuclear power plant according to the present invention is constituted by the condensed water purifying unit which includes a condensate demineralizer and either a hollow fiber filter or a pre-coat type filter having a high iron removing rate which is disposed upstream the condensed water desalter and is able to reduce the iron concentration in the feed water below 0.1 ppb, a gas injection device injecting at least one of the gases consisting of nitrogen, dinitrogen monoxide and carbon dioxide into the cooling water and having an injection point downstream the condensate demineralizer and upstream a feed water pump, means for measuring pH of the reactor water determined at a room temperature and a control unit for controlling gas injection amount of the gas injection device so as to reduce the pH of the reactor water below 6.8 based upon the determined value from the pH measuring means.

Further, it is preferable that the nuclear power plant as explained above further comprises a detector for detecting an iron concentration in the cooling water disposed downstream either the hollow fiber filter or the precoat type filter and a device which carries out backwashing of either the hollow fiber filter or the precoat type filter when the detected value from the detector exceeds a predetermined value.

Still further, it is preferable that the nuclear power plant as explained above further comprises a device for injecting hydrogen gas into the cooling water having a gas injecting point downstream the condensate demineralizer and upstream the feed water pump, a dissolved oxygen measuring means for determining a dissolved oxygen concentration in the reactor water at a room temperature and a device for controlling the injection amount from the hydrogen gas injection device so as to maintain the dissolved oxygen concentration in the reactor water below 20 ppb based upon the determined value from the dissolved oxygen measuring means.

Moreover, in the nuclear power plant as explained above it is further preferable that the flow rate of the reactor water flowing through the purifying device in the reactor water clean-up loop is set more than 2% of the flow rate of the feed water.

When restarting operation of such a nuclear power plant which has never experienced the water quality control as explained above after regular inspection, it is preferable after exchanging all of the fuel rods in the nuclear reactor or loading non-exchanged fuel rods after removing oxides of Co adhered on the fuel rod cladding tubes to incorporate the water quality control as explained above according to the present invention, in that, to maintain the iron concentration in the feed water 0.1 ppb as well as to control water quality of the cooling water so that pH of the reactor water determined at a room temperature is in a weak acidic state.

DESCRIPTION OF THE PREFERRED EMBODIMENTS

Before explaining preferred embodiment according to the present invention, principle of the present invention is explained hereinbelow.

$^{60}Co$ ion concentration in the feed water is primarily in proportion to a product of an inventory of $^{60}Co$ accumulated on the fuel cladding tube surfaces and Co ion eluting speed from oxides. Therefore, in order to reduce $^{60}Co$ ion concentration in the reactor water methods toward two directions are conceived, in that one is to decrease Co ion eluting speed and the other is to reduce the inventory of $^{60}Co$. The former relates to the conventional method wherein Co ion eluting speed is decreased by adding a proper amount of iron. The later relates to the present invention. The latter method can be achieved by reducing an inventory of Co accumulated on fuel rod cladding tubes, for this purpose two ways are conceived, in that one is to reduce Co ion deposition rate on the fuel rod cladding tubes and the other is to accelerate eluting of Co ion from oxides deposited on the fuel rod cladding tubes.

Figure 2:
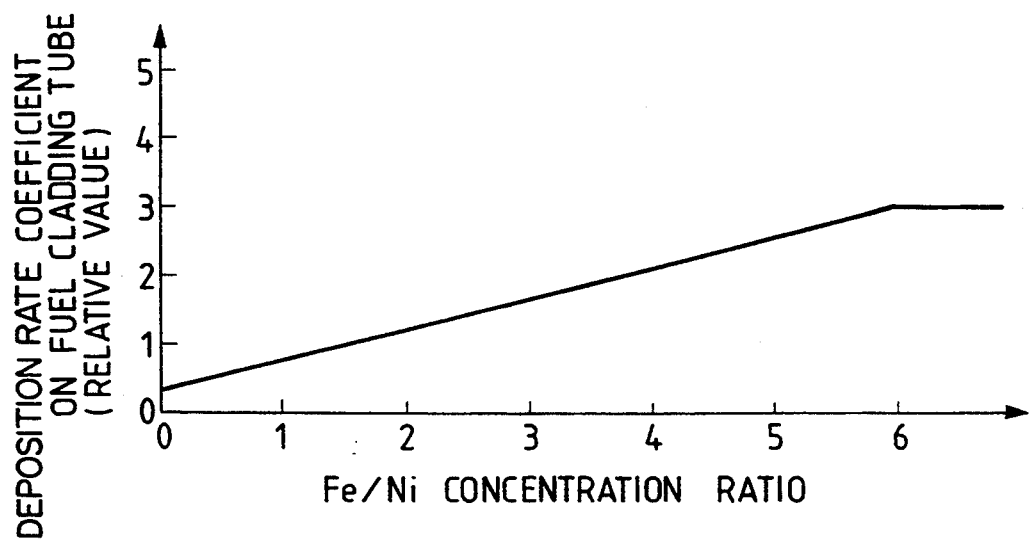
FIG. 2 is a diagram illustrating dependency on Fe/Ni concentration ratio of Co ion deposition rate coefficient on a fuel cladding tube.

In order to reduce the deposition rate of Co ions on the fuel rod cladding tubes, the Fe/Ni concentration in the reactor water is limited as much as possible by maintaining the iron concentration in the feed water as low as possible. Namely, as seen from an experimental result illustrated in FIG. 2 the deposition rate coefficient of Co ions on the fuel rod cladding tubes depends on Fe/Ni concentration ratio, and it will be seen from the drawing that the smaller the Fe/Ni concentration the harder the Co ions deposited on the fuel cladding tubes.

It is proved that the chemical form of deposits substance of Co ions when no ions exist is CoO, and the eluting speed of Co ions from this deposited CoO is one digit larger than that from ferrite oxides ($CoFe_2O_4$). Therefore, as seen from FIG. 3, which is taken under a water quality condition of nutral and having dissolved oxygen of 200 ppb, $^{60}Co$ ion concentration gradually increases when the iron concentration is successively reduced down to 0.1 ppb, however when the iron concentration is reduced beyond 0.1 ppb, the effect of reducing deposition rate of Co ions on the fuel rod cladding tubes, namely the effect of decreasing an inventory of Co accumulated on the fuel cladding tubes operates dominantly and $^{60}Co$ ion concentration in the reactor water begins to reduce. From this fact it is understood that $^{60}Co$ ion concentration in the reactor water can be kept low by suppressing the iron concentration in the feed water as low as possible such as below 0.1 ppb.

However, with the method wherein the iron concentration in the feed water is suppressed as low as possible, it is difficult to achieve a low $^{60}Co$ ion concentration than that achieved by the conventional art which uses a comparatively high iron concentration in the feed water of such as 0.5 ppb. In this respect, the conventional method, wherein the iron concentration in the feed water is controlled by adding iron to positively produce $CoFe_2O_4$ and thereby the eluting of Co ions from the produced oxide is suppressed, is understood effective for achieving reduction of $^{60}Co$ ion concentration in the reactor water. However, in Zr linered fuels which are employed these days for improving performance of the fuels, the autoclave treatment to form an oxide coating has been eliminated, due to this change the deposition of oxides on the fuel rod becomes hard, therefore with the conventional method $^{60}Co$ ion concentration in the reactor water possibly increases. Further, there are a tendency to increase the burn-up of the fuels in future and a proposal to prolong the one operation cycle period, and when these tendency and proposal are accepted, radio activation of Co deposited on the fuel cladding is quickened and the radio activity ratio thereof is increased, therefore with the conventional method it is presumed that an increase of $^{60}Co$ ion concentration in the reactor water is unavoidable.

Figure 3:
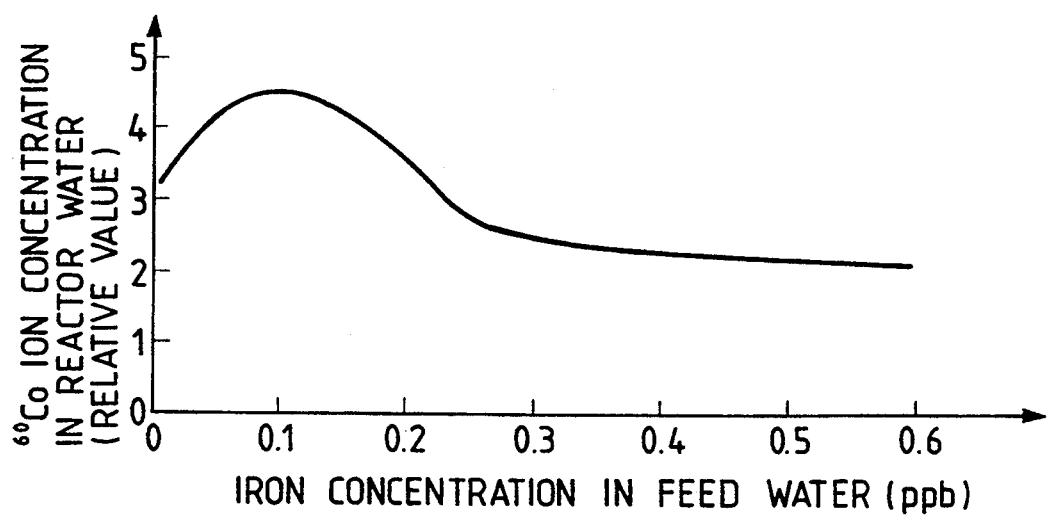
FIG. 3 is a diagram illustrating a relationship between iron concentration in a feed water having currently used normal water quality and $^{60}Co$ ion concentration in a reactor water.
Figure 4:
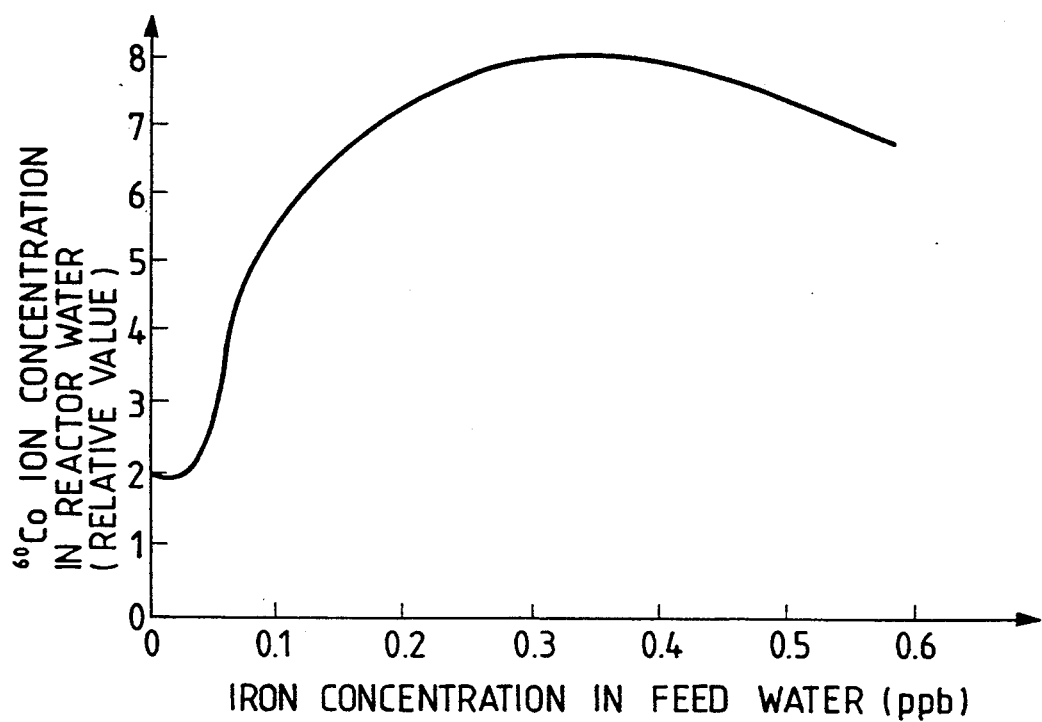
FIG. 4 is a diagram illustrating a relationship between iron concentration in a feed water and $^{60}Co$ ion concentration in a reactor water when a water quality is modified so that ion eluting speed from oxides deposited on a fuel cladding tube increases up to five times.

Now, FIG. 4 shows $^{60}Co$ ion concentration in the reactor water with respect to iron concentration in the feed water, when assuming that the ion eluting speed from deposits on the fuel rod cladding tubes is increased by 5 times faster than that under the condition of FIG. 3. As seen from FIG. 4, contrary to the tendency in FIG. 3 $^{60}Co$ ion concentration in the reactor water decreases at the lower side of iron concentration in the feed water. This is caused by the following series of causes, in that because of the increase of Co eluting speed together with the reducing effect of Co ion deposition rate on the fuel rod cladding tubes, the inventory of Co accumulated on the fuel rod cladding tubes is decreased, amount of radioactivated $^{60}Co$ is extremely reduced such that eluting gross amount of $^{60}Co$ is decreased even if the eluting speed is increased. Accordingly, when the operation environment of a nuclear power plant changes in future in a direction such as increasing the eluting speed of Co from the oxides on the fuel rod cladding tubes while using the conventional water quality control method wherein iron concentration is controlled at a high value, an increase of $^{60}Co$ ion concentration in the reactor water is predicted, however with the present invention making use of the facts illustrated in FIG. 4 an increase of $^{60}Co$ ion concentration in the reactor water can be suppressed.

Figure 5:
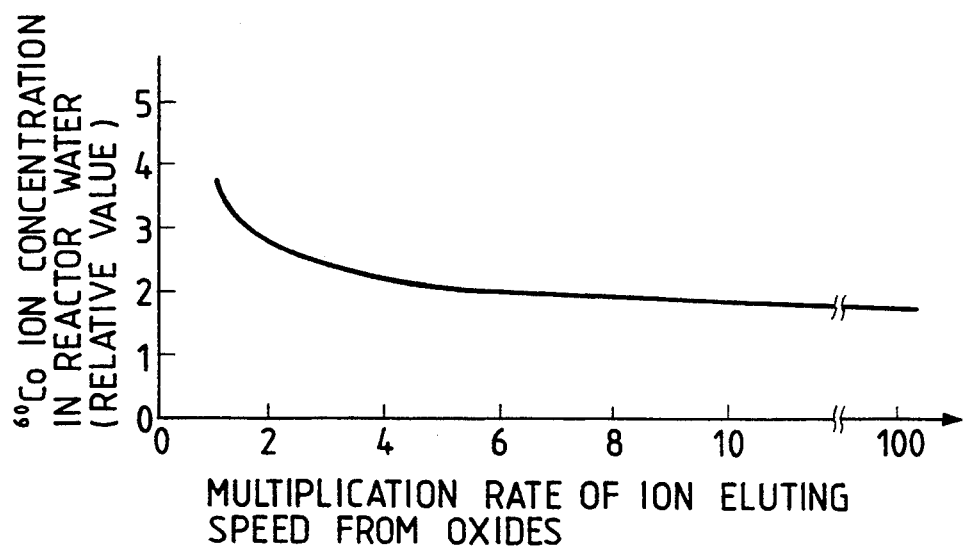
FIG. 5 is a diagram illustrating a relationship between multiplication rate of ion eluting speed from oxides deposited on a fuel cladding tube and $^{60}Co$ ion concentration in a reactor water when the ion concentration in the feed water is set at 0.01 ppb.

FIG. 5 shows an analysis result of $^{60}Co$ ion concentration in the reactor water using a parameter of multiplication rate of ion eluting speed from the fuel cladding tubes assuming that the iron concentration in the feed water is 0.01 ppb. As will be seen from the drawing, when the multiplication rate of ion eluting speed is determined more than 5, the reducing effect of $^{60}Co$ ion concentration in the reactor water exceeds one obtained by the conventional radioactivity suppressing method. Further, the inventory of Co on the fuel rod cladding tubes can be likely reduced by reducing the deposition rate coefficient of Co ions on the fuel rod cladding tubes.

Figure 6:
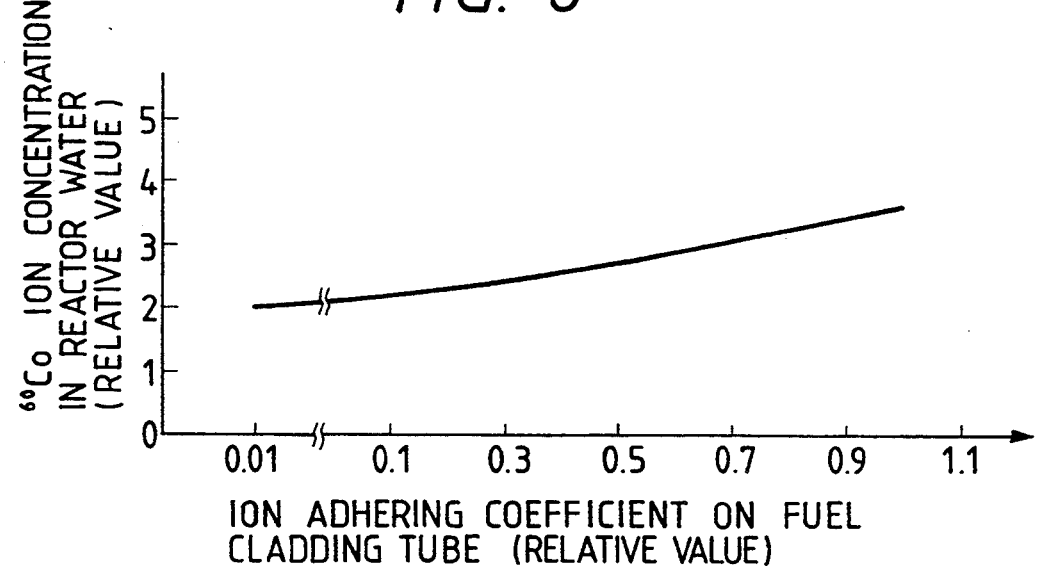
FIG. 6 is a diagram illustrating relationship between deposition rate coefficient of Co ions on a fuel cladding tube and $^{60}Co$ ion concentration in a reactor water when the ion concentration in the feed water is set at 0.01 ppb.

FIG. 6 shows an analysis result of $^{60}Co$ ion concentration in the reactor water using a parameter of deposition rate coefficient of ions on the fuel rod cladding tubes assuming that the iron concentration in the reactor water is 0.01 ppb like in FIG. 5.

From FIG. 6 it is understood that the deposition rate coefficient of ions on the fuel rod cladding tubes shows substantially the same effect for reducing the inventory of Co on the fuel rod cladding tubes as the multiplication rate of ion eluting speed from the oxides on the fuel rod cladding tubes, in that, as seen from FIG. 5 when the ion eluting speed is increased up to 100 times the relative value of $^{60}Co$ ion concentration shows about 2, in the same way as seen from FIG. 6 when the ion deposition rate coefficient is reduced down to $1/100=0.01$ the relative value of $^{60}Co$ ion concentration also shows about 2.

Based upon the facts illustrated in FIG. 3 through FIG. 6, when the iron concentration in the feed water is kept below 0.1 ppb preferably below 0.05 ppb under a condition wherein the deposition rate coefficient of Co ions onto the fuel rod cladding tubes is reduced as well as the Co ion eluting speed from the fuel cladding tubes is accelerated, it is understood that $^{60}Co$ ion concentration in the reactor water can be suppressed low in comparison with the conventional radioactivity suppressing method.

Figure 7:
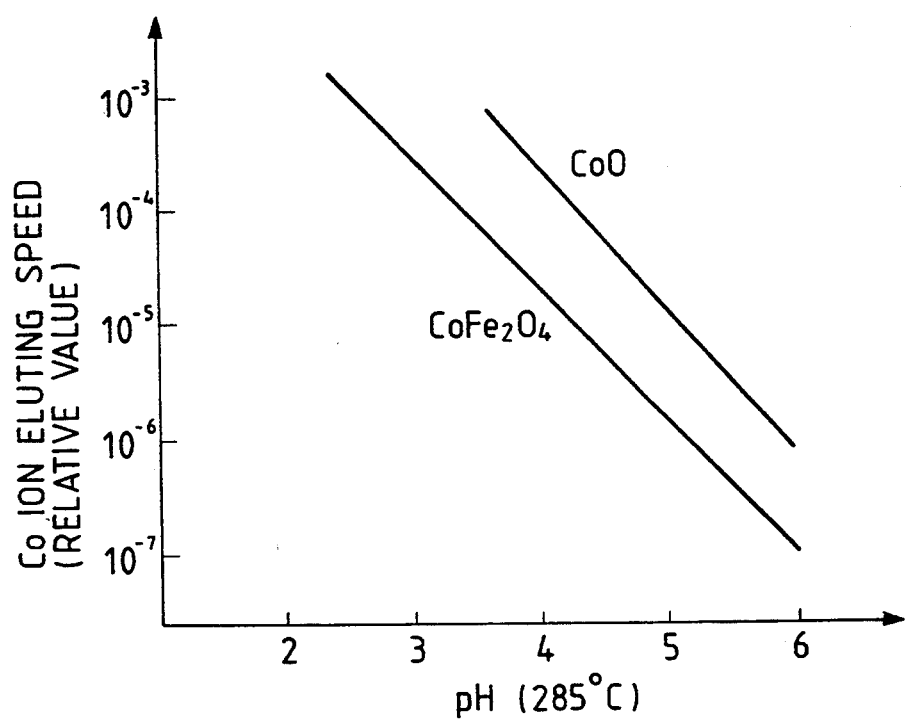
FIG. 7 is a diagram illustrating a relationship between pH of a reactor water at a high temperature and a Co ion eluting speed from oxides deposited on a fuel cladding tube.

The method of increasing the eluting speed of Co ions from the deposits on the fuel rod cladding tubes is achieved by shifting the pH of the reactor water toward an acidic state. As illustrated in FIG. 7 since eluting speed of Co ions from oxides of cobalt depends upon pH, the Co eluting speed can be increased by reducing the pH in the reactor water by making use of acidic impurities.

When the pH in the reactor water is shifted toward acidic side, corrosion of structural materials in the nuclear power plant tends to be accelerated, however when hydrogen gas is injected into the cooling water together with the pH shifting, oxygen gas produced by water decomposition via radiation is reduced such that corrosion of the structural materials such as stainless steel is suppressed.

When summing up the novel concepts according to the present invention, it is understood very effective for maintaining $^{60}Co$ ion concentration in the reactor water low to reduce the inventory of Co accumulated on the fuel rod cladding surfaces through reducing deposition of Co ions on the fuel rod cladding surfaces as well as maintaining the chemical form of Co O which can be easily dissolved by means of maintaining the ion concentration in the feed water as low as possible, and further through accelerating the eluting of Co ions from the oxides of cobalt by means of holding the pH in the reactor water at an acidic side.

In the present invention, since it is effective to reduce the inventory of Co on the fuel rod cladding tubes for suppressing the $^{60}$Co ion concentration in the reactor water as explained above, it is also effective to positively remove Co in the reactor water. In this respect, through increasing removal amount of Co in a nuclear reactor water clean-up system, in other words, the purifying unit in the reactor water clean-up loop, namely through increasing capacity of the purifying unit more than 2% of the feed water which percentage is commonly employed in the current nuclear power plant a large quantity of non-radioactive Co in the reactor water is removed and the inventory of Co on the fuel rod cladding tubes is reduced. As a result $^{60}$Co ion concentration in the reactor water is suppressed and the radioactivity can be maintained at a low level.

Now, embodiments of the present invention are explained with reference to the drawings.

EMBODIMENT 1

Figure 1:
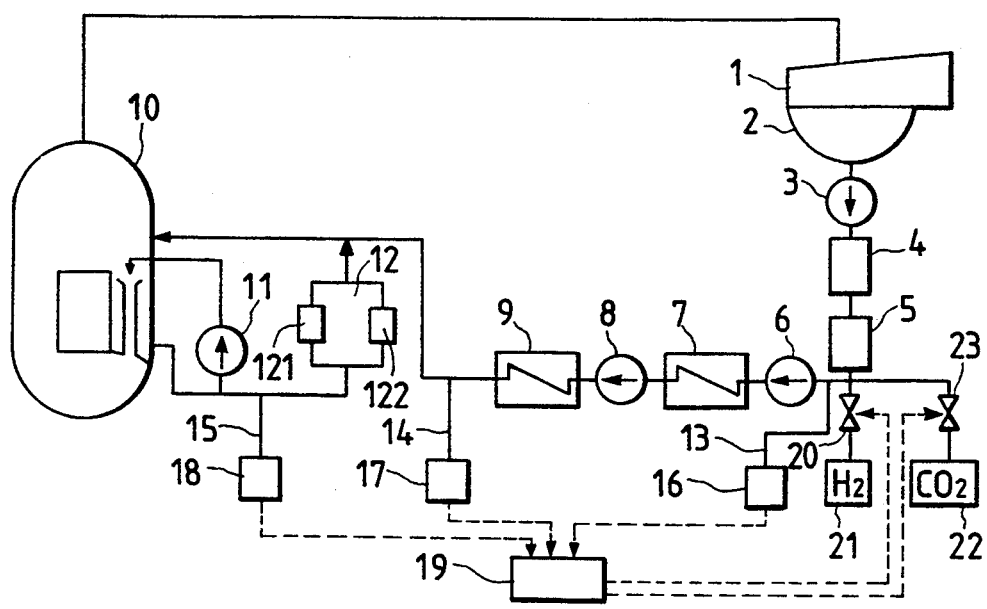
FIG. 1 is a system diagram of a primary cooling system of a boiling water reactor for explaining one embodiment according to the present invention.

Hereinbelow, one embodiment according to the present invention is explained with reference to FIG. 1, which shows a system diagram of a boiling water reactor. In FIG. 1, steam generated in a reactor 10 drives a turbine 1 and is then condensed in a condenser 2, and during the time when the condensed water including corrosion products is passed from the condenser 2 through a condensed water pre-filter 4 and a condensate demineralizer 5 by means of a condensed water pump 3, the most portion of the corrosion products are removed. The purified water is then flowed through a feed water pump 6, a low pressure feed water heater 7, a booster pump 8 and a high pressure feed water heater 9 into the nuclear reactor pressure vessel 10. The corrosion products brought into the nuclear reactor pressure vessel 10 are composed of corrosion products which have not been removed in the condensate demineralizer 5 and, in addition, Ni or the like which is primarily generated due to corrosion of the high pressure feed water heater 9. The amount of corrosion products brought in can be detected with a concentration measuring unit 17 which measures a specimen sampled out through a feed water sampling line 14. In the present embodiment, a hollow fiber filter having 100% capacity for the feed water is used for the condensed water pre-filter 4 in order to maintain the iron concentration in the reactor water below 0.1 ppb more preferably below 0.05 ppb based upon the measured concentration by the concentration measuring unit 17, and further in order to reduce corrosion of carbon steel pipings in the nuclear power plant the dissolved oxygen concentration in the feed water is controlled in a range between 20 ppb and 200 ppb by injecting oxygen gas in the feed water at an injecting point downstream the condensate demineralizer 5 and upstream the feed water pump 6. When the iron removing rate at the condensate demineralizer 5 decreases and the iron concentration in the feed water tends to exceeds 0.1 ppb, through backwashing of the condensate demineralizer 5 the inventory of iron accumulated in the condensate demineralizer 5 as well as iron leakage amount therefrom are reduced, thereby iron concentration in the feed water can be decreased.

The nuclear reactor 10 is further provided with a recirculating pump 11 which drives the cooling water in the reactor water clean-up loop for increasing the flow rate in the reactor, and a reactor water purifying unit 12 which includes two parallel sub-units 121 and 122.

At the point downstream the condensate demineralizer 5 and the upstream the feed water pump 6, a first storage tank of hydrogen gas for injecting the same into the condensed water and a second storage tank of carbon dioxide gas also for injecting the same into the condensed water are respectively connected via respective injection amount control valves 20 and 23. Immediately downstream the injection points of hydrogen gas and carbon dioxide gas and upstream the feed water pump 6 a sampling line 13 for sensing the water quality at the outlet of the condensate demineralizer 5 is provided and the dissolved gas concentration such as the injected hydrogen in the sampled water is determined by a dissolved gas concentration measuring unit 16 and then the determined data is sent to a diagnosing and controlling unit 19.

The reactor water is sampled out through a reactor water sampling line 15 and cooled down to a room temperature, thereafter the water quality of the reactor water is determined by a water quality determining unit 18 including such as a pH meter and a dissolved oxygen meter and the determined data is also sent to the diagnosing and controlling unit 19.

The diagnosing and controlling unit 19 controls the respective injection amount control valves based upon the data sent from the respective water quality determining units 16, 17 and 18.

When the iron concentration in the feed water is reduced below 0.1 ppb, it is necessary to reduce the amount of Co deposited on the fuel rod cladding tubes for reducing $^{60}$Co ion concentration in the reactor water. The necessity is fulfilled by increasing the eluting speed of Co from the deposits on the fuel rod cladding tubes. As will be understood from FIG. 5, when the eluting speed is increased by 5 times faster than that in the current nuclear power plant, the above purpose is satisfied and also as will be understood from FIG. 7 when the pH at a high temperature is reduced by 0.5, the eluting speed of Co is increased up to 5 times.

When assuming that the pH of the reactor water in the current nuclear power plant is 7, the pH at the reactor water temperature will be 5.63, therefore when the pH at the reactor water temperature is reduced to 5.13, the 5 times faster eluting speed is realized. Since boiling of the reactor water is induced on the fuel rod cladding tubes a local enrichment of impurities in the reactor water is caused. For this reason, the enrichment multiplication rate on the dryout surfaces momentarily becomes infinite, however assuming that an average enrichment multiplication rate of impurities is 100 times the pH at the room temperature will be 6.86, and the slightly acidic state of pH 6.86 at the room temperature shows pH of 5.13 at a high reactor water temperature in the vicinity of the fuel rod cladding surfaces on which oxides are deposited. Further, when assuming that an average enrichment multiplication rate of impurities is 10 times the pH at the room temperature should be 6.17. Accordingly, it is necessary to add into the cooling water impurities exhibiting an acidic nature or materials which produce impurities exhibiting an acidic nature by chemical reaction via radiation. More specifically, the necessity is fulfilled by injecting carbon dioxide gas at the outlet side of the condensate demineralizer 5 and upstream the feed water pump 6 from the carbon dioxide gas storage tank 22 via the injection amount control valve 23. The injecting point is one where oxygen gas is injected in the current nuclear power plant. Other than the carbon dioxide gas such as nitrogen gas and dinitrogen monoxide gas which generate nitric acid ions by a decomposition reaction via radiation can be injected. The amount of gas injection can be adjusted by the flow rate control valve 23 so that the pH of the reactor water at the room temperature settles below 6.8 while actually monitering the pH of the reactor water at the room temperature because the injected gas shows volatility.

Since the reducing effect of $^{60}Co$ ion concentration, in other words, the reducing effect of radioactivity is saturated when the multiplication rate of ion eluting speed exceeds 5 as seen from FIG. 5 as well as the corrosion of structural materials is accelerated at acidic side, a preferable lower limit of the pH of the reactor water at the room temperature is 5.6 which corresponds to a current water quality control standard.

The hollow fiber filter is used for the condensed water pre-filter 4 according to the present embodiment, the amount of effluents produced is reduced in comparison with a case where a precoat type filter is used for the condensed water pre-filter 4. Further, since the pH in the reactor water is controlled by the carbon dioxide gas and carbonic acid shows volatility, continuation of local enrichment for long time can hardly be induced, such that the corrosion possibility of the structural materials is reduced.

Modifications

In the previous embodiment, a hollow fiber filter is used for the condensed water pre-filter 4, however a pre-coat type filter can be used therefor. If a condensed water pre-filter 4 of such type is already installed, there is no need to modify the installation.

Further, in the previous embodiment, such as carbon dioxide gas was injected at the feed water loop for shifting the pH of the reactor water into an acid, however, by replacing beforehand the negative ion exchange resin in one line, for example line 122, of the reactor water purifying unit 12 with an ion exchange group of a nitric acid type, the pH in the reactor water can be controlled by nitric acid ions brought into the reactor water through a flow rate control of the respective sub-units 121 and 122. With the present modified embodiment there is no need to add a new installation as in the previous embodiment, however when the flow rate at the reactor water clean-up loop is restricted, the impurity removing rate thereof is reduced. Although other than nitric acid such as sulfuric acid and phosphoric acid can control the pH of the reactor water into an acid, however nitric acid has the smallest influence with regard to the stress corrosion cracking of stainless steel, nitric acid is preferable for maintaining a high soundness of the structural materials.

Still further, in the previous embodiment, such as carbon dioxide gas is injected at the feed water loop for modifying the pH of the reactor water, however, nitric acid can be directly injected in the feed water loop at the outletside of the condensate demineralizer 5 and the upstream of the feed water pump 6. However, at this instance pH of the feed water is also shifted toward an acid there arises a possibility that corrosion of the structural materials in the feed water loop is likely accelerated.

EMBODIMENT 2

In the first embodiment corrosion of the structural materials are accelerated dependent upon decrease of the pH in the reactor water, therefore the lower limit of the pH has to be set. However, corrosion of the structural materials can be suppressed by reducing the dissolved oxygen concentration in the reactor water. Namely, when the dissolved oxygen concentration is maintained below 20 ppb under which it is believed no stress corrosion crackings are usually induced the corrosion of the structural materials is suppressed even if the pH in the reactor water is decreased.

The dissolved oxygen concentration can be reduced by injecting hydrogen gas at the outlet side of the condensate demineralizer 5 and at the upstream side of the feed water pump 6 like such as the carbon dioxide gas injection. The injection amount of hydrogen gas from the hydrogen gas storage tank 21 is adjusted by the flow rate control valve 20 so that the dissolved oxygen concentration in the reactor water is maintained below 20 ppb while monitoring the same, because the reducing effect of the dissolved oxygen concentration generally varies between respective nuclear power plants.

With the present embodiment, the corrosion acceleration of the structural materials in association with the decrease of pH in the reactor water is suppressed, reliability of the nuclear power plant is improved. Further, the eluting speed is further accelerated in the present embodiment, the nuclear power plant can be operated under further lower pH of the reactor water than 5.6 which corresponds to the current control standard value.

EMBODIMENT 3

When the iron concentration in the feed water is suddenly reduced below 0.05 ppb and the pH in the reactor water is shifted toward a weak acid state for an already installed nuclear power plant which has been operated under an iron concentration more than 0.05 ppb and under a high inventory condition of Co accumulated on the fuel cladding tubes, the eluting amount of $^{60}Co$ from the fuel cladding surfaces greatly increases and $^{60}Co$ ion concentration in the reactor water becomes high. Accordingly, it is necessary to reduce in advance the inventory of Co on the fuel cladding surfaces for introducing the water quality control as disclosed such as in the first embodiment in such already installed nuclear power plant. More specifically, it is necessary to exchange all of the fuel rods at the time of a regular inspection or to remove the Co accumulated on the fuel cladding tubes after decontaminating the same with regard to non-exchanged fuel rods.

According to the present embodiment wherein all of the Co accumulated on the fuel cladding tubes are removed after the regular inspection and restarting the operation, the water quality control method for already installed nuclear power plants can be modified to that of the present invention without experiencing a transient build-up of $^{60}Co$ ion concentration in the reactor water.

With the present invention, $^{60}Co$ ion concentration in the reactor water can be maintained low during entire life time of a nuclear power plant. Further, since the production amount of $^{60}Co$ as well as $^{54}Mn$ and $^{59}Fe$ which include iron as the parent nuclide is decreased, the amount of radioactive effluents is reduced and further the concentration of radioactive corrosion products having precipitating property in the reactor water is also reduced. When concentrations of $^{60}Co$, $^{54}Mn$ and $^{59}Fe$ in the reactor water are maintained low, amount of $^{60}Co$, $^{54}Mn$ and $^{59}Fe$ which deposit on the pipings in the primary cooling system is also reduced, the dose rate in the primary system during the regular inspection is reduced as well as the dosage to which workers are exposed is reduced.

According to the present invention, even when the operation environment of a nuclear power plant changes in future toward a direction which may increase $^{60}Co$ ion concentration in the reactor such as by incorporating the hydrogen injecting operation and the fuel burn-up increasing operation, the increase of $^{60}Co$ ion concentration can be suppressed.

We claim:

1. A water quality control method for a nuclear power plant which includes a nuclear reactor, a turbine which is driven by steam generated by said nuclear reactor, a condenser which condenses the steam from said turbine, a purifying unit which purifies the condensed water from said condenser, a feed water pump and heater which heats the purified water from said purifying unit and feeds the same into said nuclear reactor as cooling water, and a reactor water clean-up loop having a further purifying unit which brings out a part of the reactor water in said nuclear reactor, purifies the same and brings back the same into the nuclear reactor comprising: the step of controlling the water quality of the cooling water which is fed to said nuclear reactor in such a direction that the inventory of Co accumulated on fuel rod cladding tubes in said nuclear reactor is decreased.

2. A water quality control method for a nuclear power plant according to claim 1, wherein said step of controlling the water quality of the cooling water includes a step of reducing deposition rate of Co ions in the reactor water within said nuclear reactor on the fuel rod cladding tubes.

3. A water quality control method for a nuclear power plant according to claim 2, wherein said step of reducing Co ion deposition rate includes a step of controlling an iron concentration in the feed water below 0.1 ppb.

4. A water quality control method for a nuclear power plant according to claim 3, wherein said step of reducing Co ion deposition rate includes a step of controlling an iron concentration in the feed water below 0.05 ppb.

5. A water quality control method for a nuclear power plant according to claim 3, wherein said step of controlling an iron concentration includes a step of removing iron components in the condensed water with said purifying unit at its maximum capacity.

6. A water quality control method for a nuclear power plant according to claim 1, wherein said step of controlling the water quality of the cooling water includes a step of increasing eluting speed of Co ions from oxides of Co accumulated on the fuel rod cladding tubes.

7. A water quality controlling method for a nuclear power plant according to claim 3, wherein said step of controlling the water quality of the cooling water further comprises a step of increasing the flow rate of the reactor water which passes through said further purifying unit more than 2% of the flow rate of the feed water.

8. A water quality control method for a nuclear power plant according to claim 1, wherein said step of controlling the water quality of the cooling water includes a step of reducing deposition rate of Co ions in the reactor water within said nuclear reactor on the fuel rod cladding tubes and a step of increasing eluting speed of Co ions from oxides of Co accumulated on the fuel rod cladding tubes.

9. A water quality control method for a nuclear power plant according to claim 8, wherein said step of increasing Co ion eluting speed includes a step of shifting the pH of the reactor water in said nuclear reactor determined at a room temperature into a weak acid state.

10. A water quality control method for a nuclear power plant according to claim 9, wherein the pH of the reactor in said nuclear reactor determined at a room temperature is controlled less than 6.8.

11. A water quality control method for a nuclear power plant according to claim 9, wherein said step of shifting the pH of the reactor water into a weak acid state includes a step of injecting a material in the cooling water which generates acidic ions in the reactor water.

12. A water quality control method for a nuclear power plant according to claim 11, wherein said material which generates acidic ions in the reactor water includes at least one of nitrogen gas, dinitrogen monoxide gas and carbon dioxide gas.

13. A water quality control method for a nuclear power plant according to claim 12, wherein said step of injecting a material into the cooling water includes the steps of sampling out the reactor water in said nuclear reactor, cooling the sampled reactor water down to a room temperature, determining the pH of the cooled reactor water and controlling the injecting gas amount into the cooling water so that the value of determined pH is kept below 6.8.

14. A water quality control method for a nuclear power plant according to claim 9, wherein said further purifying unit includes a plurality of lines of negative ion exchange resin at least one of which is nitric acid type negative ion exchange resin and said step of shifting the pH of the reactor water into a weak acid state includes a step of controlling flow rate of the reactor water passing through said further purifying unit so as to control the amount of nitric acid ions which is brought into said nuclear reactor.

15. A water quality control method for a nuclear power plant according to claim 9, wherein said step of controlling the water quality of the cooling water further includes a step of reducing the dissolved oxygen concentration in the reactor water so as to keep the same under a reducing atmosphere.

16. A water quality control method for a nuclear power plant according to claim 15 wherein the dissolved oxygen concentration in the reactor water is kept below 20 ppb.

17. A water quality control method for a nuclear power plant according to claim 16, wherein said step of reducing the dissolved oxygen concentration includes a step of injecting hydrogen gas into the cooling water so as to keep the dissolved oxygen concentration in the reactor water below 20 ppb.

18. A water quality control device for a nuclear power plant which includes a nuclear reactor, a turbine which is driven by steam generated by said nuclear reactor, a condenser which condenses the steam from said turbine, a purifying unit which purifies the condensed water from said condenser and a feed water pump and heater which heats the purified water from said purifying unit and feeds the same into said nuclear reactor as cooling water comprising: means for detecting the iron concentration in the cooling water, means for controlling the operation of said purifying unit based upon the detected value from said detecting means so that the iron concentration of the feed water is kept below 0.1 ppb, means for sampling out the reactor water in said nuclear reactor, cooling the sampled reactor water down to a room temperature and determining the pH of the cooled reactor water and means for shifting the pH of the reactor water into a weak acid state determined at the room temperature based upon the determined value from said determining means.

19. A nuclear power plant comprising:
    a nuclear reactor;
    a turbine which is driven by steam generated by said nuclear reactor;
    a condenser which condenses the steam from said turbine;
    a purifying unit which purifies the condensed water from said condenser, said condensed water purifying unit includes a condensate demineralizer and one of a hollow fiber filter and a pre-coat filter having an iron removing rate which enables to maintain the iron concentration rate in the feed water below 0.1 ppb and disposed at upstream side of said condensate demineralizer;
    a feed water pump and heater which heats the purified water from said purifying unit and feeds the same into said nuclear reactor as cooling water;
    a gas injection unit having a gas injecting point at the downstream side of said condensate demineralizer and at the upstream side of said feed water pump and heater and injecting at least one of nitrogen gas, dinitrogen monoxide gas and carbon dioxide gas into the cooling water;
    a pH measuring means for determining pH of the reactor water in said nuclear reactor at a room temperature; and
    a control unit which controls a gas injection amount from said gas injecting unit based upon the determined value from said pH measuring means so as to decrease the pH of the reactor water below 6.8 determined at the room temperature.

20. A nuclear power plant according to claim 19, further comprising:
    a detector which is disposed at downstream side of either said hollow fiber filter or said precoat type filter and detects the iron concentration in the cooling water; and
    an arrangement which performs backwashing of either said hollow fiber filter or said pre-coat type filter when the detected value from said detector exceeds a predetermined value.

21. A nuclear power plant according to claim 19, further comprising:
    a further gas injecting unit having a gas injecting point at the downstream side of said condensate demineralizer and at upstream side of said feed water pump and heater and injecting hydrogen gas into the cooling water;
    a dissolved oxygen measuring means for determining the dissolved oxygen concentration in the reactor water; and
    a further control unit which controls a gas injection amount from said further gas injection unit based upon the determined value from said dissolved oxygen measuring means so as to reduce the dissolved oxygen concentration in the reactor water below 20 ppb.

22. A nuclear power plant according to claim 19, further comprising:
    a reactor water clean-up loop having a further purifying unit which brings out a part of the reactor water in said nuclear reactor, purifies the same and brings back the same into the nuclear reactor, the purifying flow rate of said further purifying unit is set at more than 2% of the feed water flow rate.

23. An operating method of a nuclear power plant which includes a nuclear reactor, a turbine which is driven by steam generated by said nuclear reactor, a condenser which condenses the steam from said turbine, a purifying unit which purifies the condensed water from said condenser, a feed water pump and heater which heats the purified water from said purifying unit and feeds the same into said nuclear reactor as cooling water, comprising the steps of:
    either exchanging all of the fuel rod in said nuclear reactor or loading non-exchanged fuel rods after removing oxides of Co deposited on the fuel rod cladding tubes after a regular inspection and before restarting of the nuclear power plant;
    maintaining the iron concentration in the feed water below 0.1 ppb; and
    controlling the water quality of the cooling water so that the pH of the reactor water in said nuclear reactor is shifted into a weak acid state determined at a room temperature.

* * * * *